No. 726,396. PATENTED APR. 28, 1903.
A. B. BLYHOLDER.
FARM GATE.
APPLICATION FILED JUNE 1, 1901.
NO MODEL. 3 SHEETS—SHEET 1.

WITNESSES,
K. M. Imboden,
R. M. Combs.

INVENTOR,
A. B. Blyholder.
By Higdon & Higdon,
Att'ys.

No. 726,396. PATENTED APR. 28, 1903.
A. B. BLYHOLDER.
FARM GATE.
APPLICATION FILED JUNE 1, 1901.
NO MODEL. 3 SHEETS—SHEET 2.
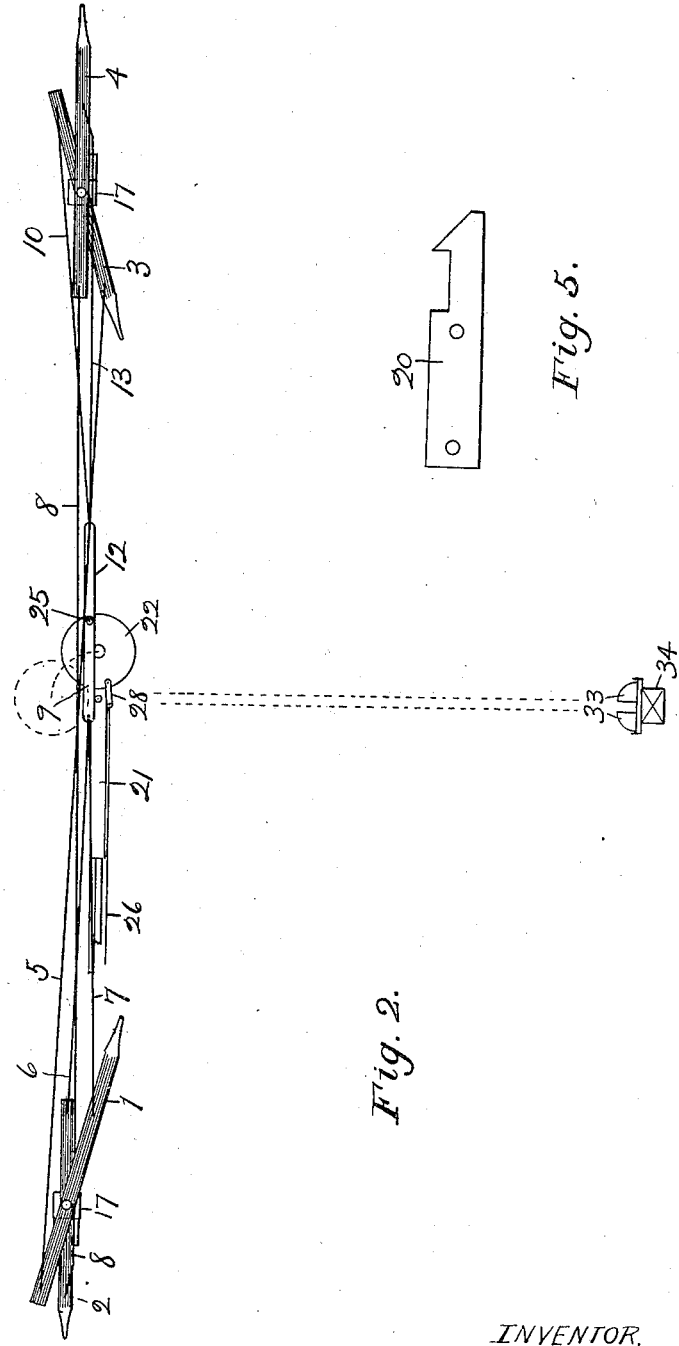
WITNESSES:
INVENTOR,
A. B. Blyholder
By Higdon & Higdon,
Attys.

UNITED STATES PATENT OFFICE.

AMOS B. BLYHOLDER, OF RAYMORE, MISSOURI.

FARM-GATE.

SPECIFICATION forming part of Letters Patent No. 726,396, dated April 28, 1903.

Application filed June 1, 1901. Serial No. 62,708. (No model.)

*To all whom it may concern:*

Be it known that I, AMOS B. BLYHOLDER, a citizen of the United States, and a resident of Raymore, in the county of Cass and State of Missouri, have invented a new and useful Improvement in Farm-Gates, of which the following is a specification.

My invention relates to farm-gates; and my invention consists in the novel combination and arrangement of parts, as hereinafter described, and pointed out in the claim.

Figure 1:
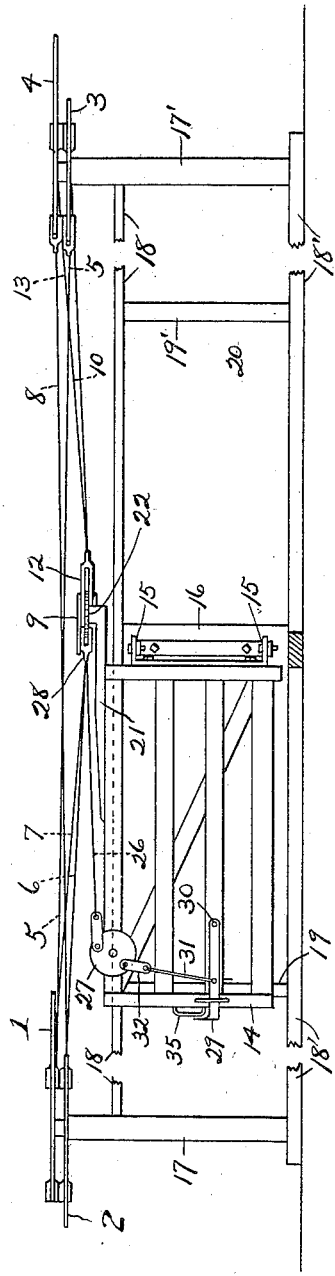
Figure 4:
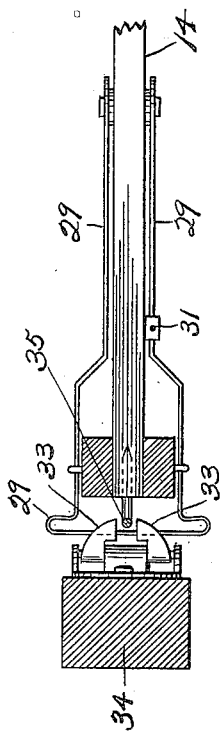
Figure 3:
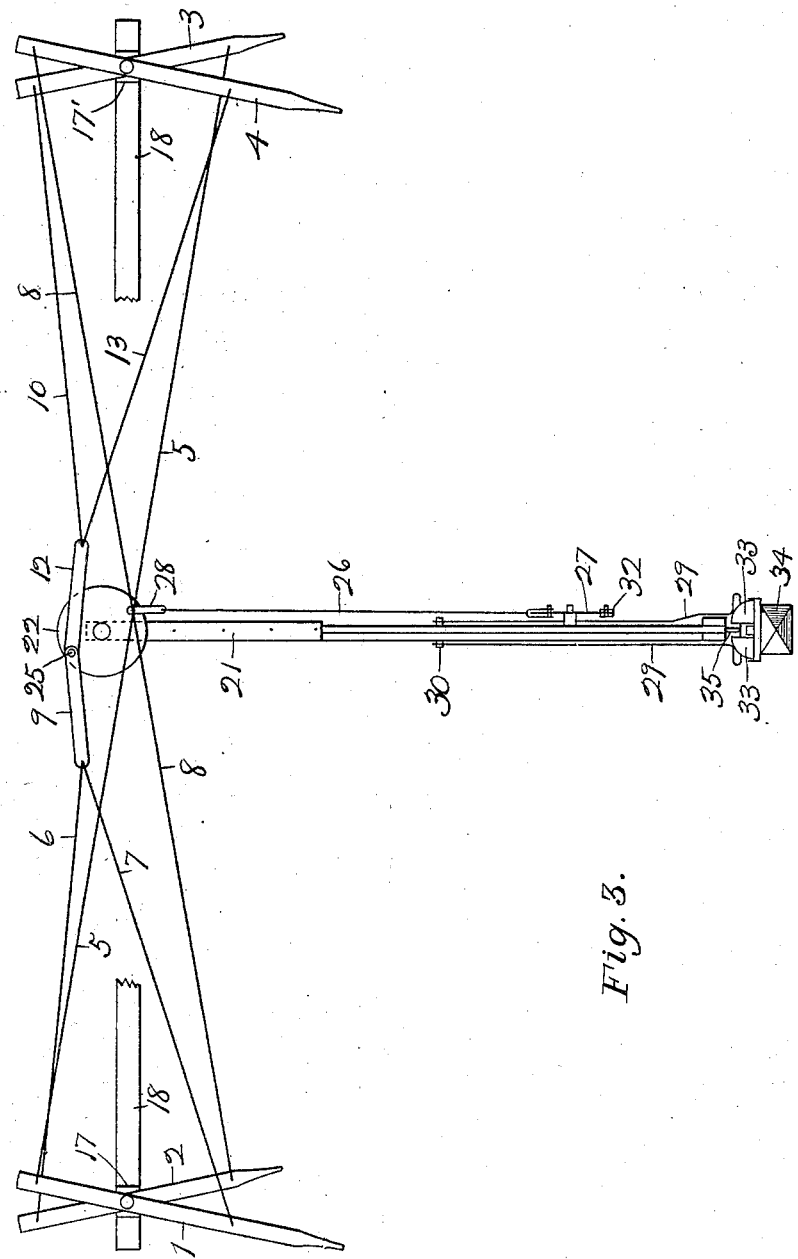

Referring now to the accompanying drawings, Figure 1 is an elevation of an open gate constructed in accordance with my invention, showing the operating-levers proportionately close to the gate-post and the parts 18 and 18' being broken. Fig. 2 is an enlarged plan view of the gate in open position, showing the operating-levers proportionately close to the gate-post, the outer end of the gate being broken away. Fig. 3 is a plan view of the gate in closed position, showing the operating-levers proportionately close to the gate-post and the parts 18 and 18' being broken. Fig. 4 is an enlarged detail plan view of the gate-latch, the post and the end of the gate being in section.

16 is the gate-post, which is provided with hinges 15 for supporting the gate. The gate-post 16 is connected by sills 18' and braces 18 with the two lever-supporting posts 17 and 17'. Two intermediate posts 19 and 19' are provided with latch-plates 20 for engaging the gate-latch, as described hereinafter.

In the drawings the lever-supporting posts are shown as rather near to the gate-post 16; but in practice the said posts must be at such distances from the gate-post that a driver may operate either of the closing-levers when his vehicle has passed the open gate far enough to permit the gate to be closed.

Secured to the top bar of the gate is an arm 21, which extends beyond the inner end of the gate, as most clearly shown in Fig. 1. On or near the end of the arm 21 is rotatably mounted a circular crank-plate 22. An upright crank-plate 27 is mounted on one side of the gate and is connected to crank-plate 22 by a wire 26. 29 is a latch-lever pivotally secured to the gate at 30. This lever is connected to crank-plate 27 by a wire 31. To the middle latch-post 34 is secured a latch-holder comprising a pair of dogs 33, pivoted for vertical movement. A vertical rod 35 is secured to the end of the gate and is adapted to be held between the dogs 33 when the latter are at rest. The middle portion of the latch-lever 29 extends across the end of the gate below the dogs 33, and when the gate is closed (the rod 35 being then between the dogs 33) and the latch-lever 29 is raised it lifts the dogs 33 out of the path of the rod 35 and permits the gate to be swung in either direction. When the gate is nearly closed, the latch-lever 29 will push up one of the dogs 33, owing to the shape of the latter, and when it has passed the dog the dog will fall, so that the gate will be held closed by the dogs engaging rod 35 until the latch-lever is raised.

I disclaim any novelty for and in the construction of the above-described latch.

At the top of post 17 are fulcrumed an opening-lever 2 and a closing-lever 1, said closing-lever being above said opening-lever. At the top of the other similar post 17' are fulcrumed an opening-lever 3 and a closing-lever 4. Levers 1 and 2 are connected by wires or cables 7 and 6, respectively, to a point on the aforesaid crank-plate 22 by means of a staple or clevis 9, which is connected to the crank-plate by a bolt 25. Pivoted on this bolt 25 also is another clevis or staple 12, to which are connected two wires 10 and 13, connected to levers 3 and 4, respectively. A wire 8 connects lever 4 to lever 2, and a wire 5 connects lever 3 to lever 1, as shown.

The operation of the gate is as follows: Suppose a person to be driving toward the closed gate from the left, 2 being the opening-lever. It is pushed ahead—*i. e.*, to the right—and this opens the gate ahead by pulling on wire 6 and crank-plate 22. After passing the gate the driver grasps the closing-lever 4 and pulls it in the direction in which he is going, which pulls wire 13 and crank-plate 22, and thereby closes the gate. The pulls on the wires 6, 7, 10, and 13 are transmitted to the gate through the spindle of crank-plate 22. The operation and action of the levers by a person going in the opposite direction would be the same as that described, the action of lever 3 being the same as that of lever 2 and that of lever 1 being the same as that of lever 4. Whenever either opening-lever is pulled, the resulting movement of crank-plate 22 will pull wire 26, turn crank-plate 27, and raise the latch-lever 29, thereby unlatching the gate from post 34.

It will be evident that the opening and closing levers are very easy to operate, as they are always moved in the direction in which the driver is going.

It is immaterial whether the handles of the opening or the closing levers be the longer.

Having now described my invention, what I claim as new, and desire to secure by Letters Patent of the United States, is—

The combination, with an end-hinged gate, of an arm secured to the top of the gate, said arm extending beyond the hinged end of the gate, a circular plate pivoted centrally upon said arm near the outer end thereof, a latch and a crank-plate on the gate, a connection between the latch and the crank-plate, a connection between said crank-plate and said circular plate, two lever-supporting posts, arranged in opposite directions from the gate-posts, an opening-lever and a closing-lever fulcrumed upon each of said posts, a cable connecting the opening-lever at the right of the gate to the closing-lever at the left of the gate, a cable connecting the opening-lever at the left of the gate to the closing-lever at the right of the gate, a pair of clevises connected to a point on said circular plate, two cables connecting one of said clevises to an adjacent opening-lever and closing-lever respectively, and two cables connecting the other clevis to the other two levers respectively, substantially as described.

In testimony whereof I affix my signature in the presence of two witnesses.

AMOS B. BLYHOLDER.

Witnesses:
M. L. LANGE,
K. M. IMBODEN.